Nov. 19, 1957
W. P. UHLER
2,813,337
HOLDER FOR ROTATABLE TOOLS
Filed Nov. 10, 1955
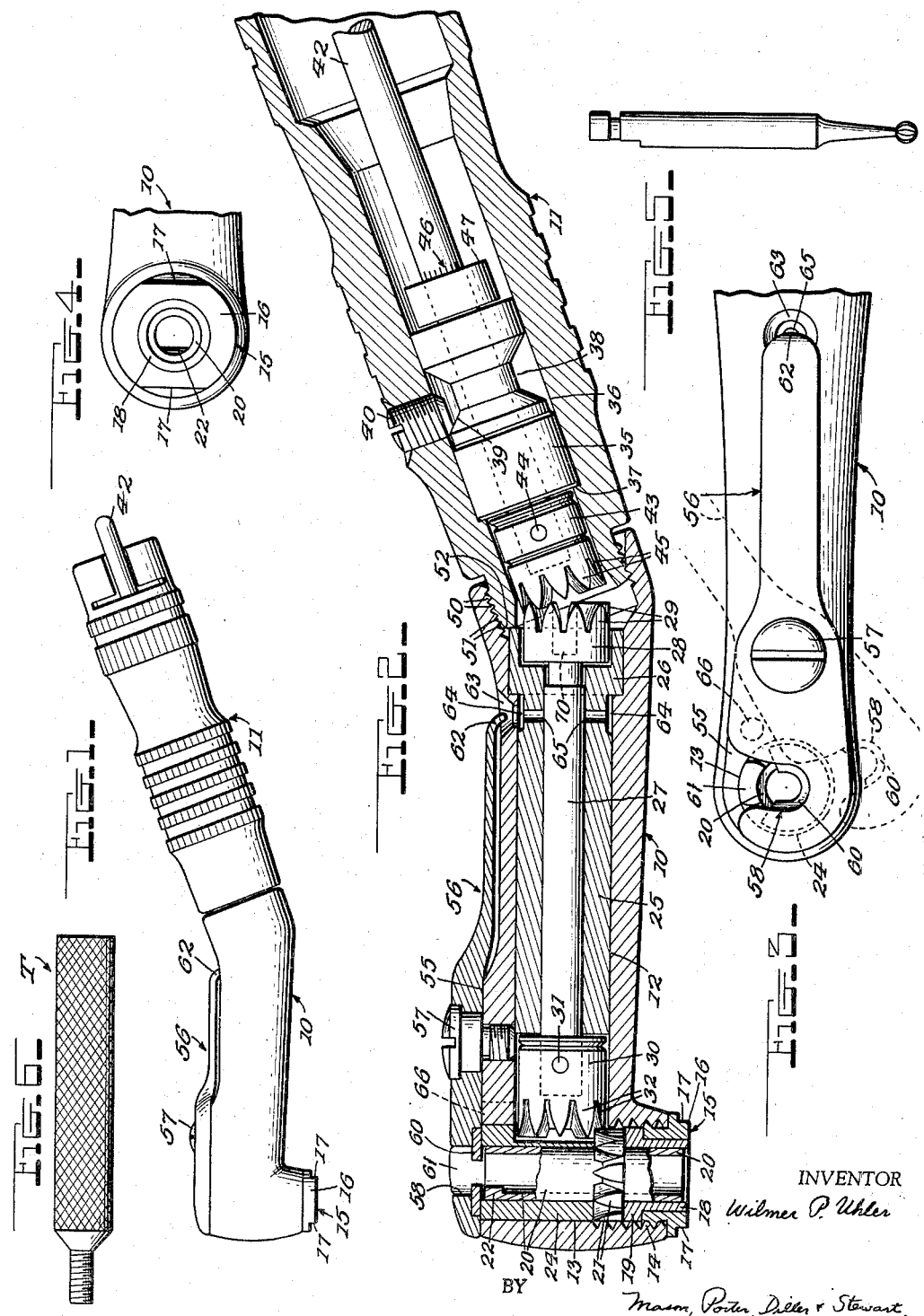
INVENTOR
Wilmer P. Uhler
BY
Mason, Porter, Diller & Stewart,
ATTORNEYS

United States Patent Office 2,813,337
Patented Nov. 19, 1957

2,813,337
HOLDER FOR ROTATABLE TOOLS

Wilmer P. Uhler, Tottenville, N. Y., assignor to The S. S. White Dental Manufacturing Company, Philadelphia, Pa., a corporation of Pennsylvania Application November 10, 1955, Serial No. 546,060

9 Claims. (Cl. 32—27)

This invention relates to supporting holders for rotatable tools, such as contra-angle handpieces used by dentists.

An object of the invention is to provide a holder in which a bur or other rotatable tool can be easily inserted and held, and from which the tool can be quickly removed.

Another object is to provide a handpiece having internal protected rotating parts which are mounted for free rotation and are positively held in position for proper interaction.

A further object is to provide a handpiece which can be easily taken apart and reassembled when necessary.

With these and other objects in view, as will appear from the course of the following description, an illustrative form of practice is shown on the accompanying drawings, in which:

Fig. 1 is an elevation of a handpiece according to this invention;

Fig. 2 is an axial section through the same;

Fig. 3 is an elevation showing a swing slide structure;

Fig. 4 is an end view of the nosepiece and chuck sleeve;

Fig. 5 is an elevation of a bur;

Fig. 6 is an elevation of an assembly and disassembly tool.

In these drawings, the illustrative contra-angle dental handpiece is shown as having a body for gripping in the hand, and comprised of a head portion 10 and a tail portion 11.

The head portion 10 has a bore 12 extending from its rear end, and a cross bore 13 through its front end and intersecting the bore 12. One end of the bore 13, being the lower end in Figs. 1 and 2, is provided with internal threading 14 for receiving the externally threaded with internal threading 14 for receiving the externally threaded nosepiece 15 which has a peripheral flange 16 for bearing against the head portion 10 and determining the working position of the nosepiece: and flats 17 for engagement by a wrench. A bearing sleeve 18 is tightly fitted in the nosepiece and has an outward flange 19 at its inner end. These parts 15, 16, 17, 18, 19, provide a removable threaded nose structure. A chuck sleeve or bur tube 20 at one end is a close rotating fit within the bearing sleeve 18, and has thereon a projecting ring of gear teeth 21 formed integrally therewith or separately formed and secured by brazing. At the other end, the chuck sleeve 20 has an inward projection 22 for engaging the flat on the shank of a bur or other rotatable tool (Fig. 5). A second bearing sleeve 24 is tightly fitted into the cross bore 13 for receiving the other end of the chuck sleeve; this sleeve 24 being cut away at the part facing the bore 12, as referred to hereinafter. When the parts are in operative position, the chuck sleeve rotates in and is guided against radial movements and cocking by the bearing sleeves which support the same at both ends and for a major portion of its length. The gear ring 21 is supported by wide end faces of the sleeves against axial movements of the chuck sleeve 20.

The bore 12 of the head portion 10 receives a long bearing sleeve 25 which is closely fitted but slidable therein, and has an enlarged rear end 26 providing a shoulder for engaging a shoulder at an enlarged rear portion of the bore 12, whereby to determine the forward movement of the sleeve 25. A head shaft 27 has an enlarged head 28 at its rear end, this head 28 having crown teeth 29 thereon. The sleeve 25 is counter-bored at its rear end to receive a part of the head 28, with the teeth 29 projecting, and the bottom surface of the counterbore acts to resist forward axial thrusts upon the head shaft 27 under gear tooth pressure. The front or left-hand end of the head shaft 27 (Fig. 2) has a tightly fitting collar 30 held against rotational or axial displacement by a pin 31. The collar 30 abuts the front end of the bearing sleeve 25, whereby rearward axial shaft motion is limited. The collar 30 has crown teeth 32 on its end in mesh with the teeth of chuck gear ring 21, these teeth turning in the space provided at the cut-away part of the bearing sleeve 24.

The tail portion 11 has an axial bore with several successive diameters. A bearing sleeve 35 is a close sliding fit in bore portion 36, and at its front end bears against a shoulder 37 at the forward end of bore portion 36. The sleeve 35 has a peripheral groove 38, this groove having a conical front wall 39 for engagement by the inner conical end of a screw 40 which thus serves to press the bearing sleeve toward the front into engagement with shoulder 37, and to hold it in such position.

The tail shaft 42 turns in the sleeve 35 and has at its front end a collar 43 held in place by pin 44; this collar having crown teeth 45 which are in mesh with the crown teeth 29 during operation, and bearing rearwardly against the end face of the sleeve 35 for resisting axial reaction effects betweeen the gear teeth. A part 46 of the tail shaft 42 is knurled to provide an increased diameter, and the collar 47 is forced thereon, to a spacing from collar 43 for providing running fits at the ends of the sleeve 35.

The rear end of the head portion 10 is angularly directed at about 20 degrees in the illustrative form, and this rear end has a hole larger than the bore 12, so that the bearing sleeve 25 can be inserted and removed. The rear end has internal threads 50 to engage the external threads 51 at the front end of the tail portion 11. The front end of the tail portion 11 is formed with a conical surface 52 for engaging the rear end of the bearing sleeve 25 so that as the parts are screwed together, the sleeve is forced forward until its head 26 engages the shoulder in the head portion 10, at which time the head and tail shafts are properly positioned for smooth inter-driving through the gear teeth.

The head portion 10 has a flat surface 55 illustrated as flush with the end of bearing sleeve 24. The swing slide lever 56 at its inner face fits this surface and pivots about a screw 57. The lever 56 has a notch 58 in its side (Fig. 3) and is provided at its lower face with an inserted wear piece 60 of U-shape, with its opening alined with the lever notch, and of an internal diameter and thickness to fit the groove in the shank of the bur (Fig. 5): the wear piece can be secured by brazing. In the full line position of Fig. 3, the wear piece overlies the chuck hole, for holding the bur in position: in the dotted line position, the bur is freed for removal. It is preferred to have a lug 61 formed on the sleeve 24, for closing the notch in operating or full line position, thus protecting against contact of the rotating bur with the operator's fingers and protecting the patient's lip against abrasion or pinching by the rotating end of the bur, along with providing a generally smooth external composite surface. The other end of swing slide lever 56 is springy and has an end 62 turned toward the head portion 10; and this head portion has a notch 63 for receiving this end, so that the end 62 will snap into and be detained in the notch 63 when the parts are in operative position.

It is preferred to extend the notch 63 as a small hole through the head portion wall, and to provide a peripheral groove 64 on the sleeve 25 in alinement therewith, with holes 65 leading to the head shaft 27. Thus an oiling point is provided at the rear end of the head shaft. An oil hole 66 can be provided at surface 55 of the body portion 10, leading to the gear teeth space; and covered (Fig. 3) by the slide lever 56 in its operative position but accessible when the lever is swung away.

The collar 28 is illustratively integral and has a threaded axial hole 70, for engagement by the threaded end of the special tool T, Fig. 6, when the head and tail portions are separated, for assisting in the withdrawal of the head shaft and its bearing sleeve.

The rear end of the tail portion is illustrated with a convential bore and arrangement for receiving the nose end of a conventional type of dental handpiece for engaging and rotating the tail shaft. As the tail shaft 42 rotates, its gear teeth 45 engage and move the teeth 29 so that the head shaft 27 rotates with its teeth 32, and the latter in turn move the teeth 21 of the chuck sleeve 20 so that the latter turns and by its projection 22 causes positive rotation of the bur.

To separate the parts from the assembly condition of Fig. 2, the tail and head portions are relatively rotated, so that the threads 50, 51 and the teeth 45, 29 separate. The screw 40 is loosened, and the tail shaft sub-assembly of parts 42, 46, 47, 35 and 43 can be withdrawn through the rear end of the tail portion: re-assembly being effected in reverse manner. With the tail portion removed, the tool T can be threaded into the toothed collar 28, noting that a bur in the chuck sleeve 20 can be held for preventing shaft rotation, and the head shaft sub-assembly of parts 27, 28, 25, 30 can be withdrawn through the rear end of head portion 10: re-assembly being effected in reverse manner, with minor relative rotation of the shaft or chuck sleeve if necessary for initial gear meshing, and completed when the head and tail portions are screwed together. The nosepiece 15 with bearing 18 can be loosened by a wrench and removed, and the chuck sleeve 20 and its gear ring are then free for removal: re-assembly is accomplished in a reverse manner. The swing slide lever 56 can be easily removed by backing out the pivot screw 57; and re-assembled in reverse manner. Thus all parts can be removed, and the shafts and bearings remaining in sub-assemblies with running clearance as determined in manufacture.

Upon separation of the handpiece from its driving means, it can be sterilized as a whole; and it will be noted that holes or other access are provided for easy lubrication. During such operations, the sub-assemblies are withdrawn without changing the factory-set running condition of the parts, and are then capable of examination for cleanliness and wear. If any part is worn or damaged, it can be replaced by a new unit which has been assembled at the factory of proper size and running clearance. Thus, inspection with replacement as necessary is simple; during re-assembly the parts are screwed together until the parts encounter shoulders in the outer portions, and no careful adjustment by the dentist is necessary for obtaining an accurate running fit of the parts. Chuck sleeve 20 with its gear teeth 21, if worn, can be removed through the opening left on removing externally threaded nosepiece 15 and replaced in a similar manner with a new part. With the chuck sleeve and gear assembly in proper position so that gear teeth 21 properly engage crown teeth 32, nosepiece 15 is replaced and the head portion of the angle will then again be in proper operating condition.

The structure lends itself to the employment of shafts and bearing parts of long-wearing material. Thus the shafts, bur tube, bearing sleeves and gears can be of hard steels accurately ground to shape and size, and the bearing sleeves and wear piece 60 may be made of molded carbide finished accurately to dimensions and smoothness. The gear pieces likewise can be made of wear-resistant material; e. g. hardened steel.

The invention is not limited to the illustrative form but may be employed in many ways within the scope of the appended claims.

What is claimed is:

1. A handpiece for a rotatable tool comprising a body portion having bores therein at angles to one another, a chuck sleeve in one said bore having a toothed peripheral projection fixed thereon between the ends of the sleeve, said one bore having threads at its end, a threaded nose structure engaged with said threads and providing a radial bearing for the adjacent end of the chuck sleeve and a thrust bearing for said projection, and a second bearing sleeve tightly fitted in said one bore and providing a radial bearing for the other end of the chuck sleeve and an opposed thrust bearing for said projection, and driving means located in another said bore and having gear teeth in mesh with the aforesaid gear teeth.

2. A handpiece as in claim 1, in which the second bearing sleeve is cut away at said other bore, and the driving means has the gear teeth moving through the space afforded by the cut-away.

3. A handpiece as in claim 1, in which the nose structure comprises an outer hollow member threaded in the said one bore and having a peripheral flange engaged with the body portion at the end of said bore, and an inner bearing sleeve for the chuck sleeve and having a peripheral flange overlying the inner end of the hollow member for transmitting end thrusts between the projection and the outer member.

4. A handpiece for a rotatable tool comprising a body portion having bores therein at angles to one another, a rotatable member in one said bore having a toothed peripheral projection thereon, a second rotatable member in another bore having an enlarged rear end, a toothed collar secured on the front end of said second rotatable member, the teeth of said collar being in mesh with the teeth on the peripheral projection, a bearing sleeve surrounding the said second rotatable member for supporting the same and receiving end thrusts by said collar and said enlarged end, said sleeve having an enlarged portion adjacent said enlarged end, said body portion having an internal shoulder in said other bore, said other bore having an internal thread at its rear end and providing passage for insertion and withdrawal of the bearing sleeve and rotatable member, and threaded means engaged in said internal thread and presenting a surface for pressing against the enlarged end of said sleeve and seating the same against said shoulder.

5. A handpiece as in claim 4, in which the threaded means is a hollow tail portion, and said enlarged head has gear teeth thereon, and including a tail shaft having spaced collars thereon, one said collar being at the front end of the shaft and having gear teeth engaged with the teeth on the enlarged head, the tail portion having an internal shoulder and an enlarged bore extending from the shoulder, and a tail bearing sleeve surrounding the tail shaft between the collars for controlling axial movements of the tail shaft, said tail bearing sleeve having a peripheral groove therein, and externally accessible means carried by the tail portion and engaging a wall of said groove for pressing the tail bearing sleeve against the last-mentioned shoulder for determining the engagement of said gear teeth.

6. A handpiece as in claim 5, in which the peripheral groove has an inclined wall at the side adjacent said shoulder, and said externally accessible means is a screw extending through the wall of said tail portion and engaged with said inclined wall.

7. A handpiece for a rotatable tool having a peripheral groove, comprising a body structure having a bore hole therethrough, a chuck sleeve rotatably supported in said bore hole and adapted for receiving said tool with the groove thereof extending beyond said sleeve and body portion, a swing slide lever pivotally mounted on the body portion and having a notch therein for passing around the tool, said slide having an inward extension in the notch for engaging said groove, and a projection from the body structure for filling part of said notch when the swing slide lever is in position with said extension in the tool groove.

8. A handpiece as in claim 7, in which a recess is provided in the face thereof adjacent the bore hole, and a wear member is secured in said recess and projecting therefrom for providing said inward extension.

9. A handpiece for a rotatable tool comprising a body head portion having bores therein with their axes at an angle to one another, a bearing sleeve tightly fitted in one end of one of said bores, a chuck member rotatable in said sleeve and having projecting means for engaging the end of said sleeve for resisting axial thrust and having gear teeth, a nosepiece in threaded engagement at the other end of said one bore and including a bearing for rotatably receiving the chuck member and engageable with the projecting means for resisting axial thrust; another said bore having a shoulder, a first shaft and bearing sub-assembly insertable in said other bore from the rear end thereof and including a shaft bearing sleeve having a surface for engaging said shoulder whereby to determine the axial position of the bearing in said other bore, and also including a shaft rotatable in said shaft bearing sleeve, said shaft having projections with surfaces engageable with the ends of the shaft bearing sleeve for limiting relative axial movements therebetween, said shaft having gear teeth at its ends, the gear teeth at the front end being in mesh with the teeth on said chuck member; a body tail portion having a bore therein with a shoulder, a second shaft and bearing sub-assembly insertable in the tail portion bore and including a tail bearing sleeve having a surface for engaging said tail portion shoulder, and also including a tail shaft rotatable in said tail bearing sleeve, said tail shaft having projections engageable with the ends of the tail bearing sleeve for limiting relative axial movements therebetween, said tail shaft having gear teeth at its front end in mesh with the gear teeth at the rear end of the first said shaft; said head and tail portions having interengaging threads and said tail portion having a front end surface for engaging the said shaft bearing sleeve whereby during the threading assembly the said tail portion causes the shaft bearing sleeve to engage the shoulder in the head portion; said chuck member with its projecting means being removable upon separation of the said nosepiece, said first shaft and bearing sub-assembly being removable from the rear of the head portion upon separation of the said head and tail portions, and said tail shaft and bearing sub-assembly being removable from the rear of the head portion; and releasable means for engaging the tail bearing sleeve and holding the same against the tail portion shoulder and preventing rearward axial movement of the said tail sub-assembly.

References Cited in the file of this patent
UNITED STATES PATENTS

| | | |
|---|---|---|
| 2,315,016 | Shotton | Mar. 30, 1943 |
| 2,568,315 | Bjorklund | Sept. 18, 1951 |

FOREIGN PATENTS

| | | |
|---|---|---|
| 652,726 | Germany | Nov. 5, 1937 |